(12) United States Patent
Thoreen (10) Patent No.: US 8,665,120 B2
(45) Date of Patent: Mar. 4, 2014

(54) PRIMARY FLIGHT DISPLAY PITCH- AND POWER-BASED UNRELIABLE AIRSPEED SYMBOLOGY

(75) Inventor: Adam Marshall Thoreen, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 463 days.

(21) Appl. No.: 13/115,450

(22) Filed: May 25, 2011

(65) Prior Publication Data

US 2012/0299753 A1     Nov. 29, 2012

(51) Int. Cl.
*G01C 23/00*     (2006.01)

(52) U.S. Cl.
USPC ........... 340/975; 340/971; 340/973; 340/974; 701/4; 701/14

(58) Field of Classification Search
USPC ................. 340/971, 973, 974, 975; 701/4, 14
See application file for complete search history.

(56) References Cited

U.S. PATENT DOCUMENTS

| | | |
|---|---|---|
| 5,039,037 A | 8/1991 | DeLuca |
| 5,382,954 A | 1/1995 | Kennedy, Jr. et al. |
| 2010/0100260 A1 | 4/2010 | McIntyre et al. |

FOREIGN PATENT DOCUMENTS

EP     1 462 767 A1     9/2004

OTHER PUBLICATIONS

Barthe, "AF447—Unreliable Speed," published on Safety First # 5, Dec. 2001 (see http://aviationtroubleshooting.blogspot.com/2009/06/af447-unreliable-speed-by-joelle-barth).
International Search report and Written Opinion. International Application No. PCT/US2012/033931, Aug. 6, 2012.

*Primary Examiner* — Andrew Bee
(74) *Attorney, Agent, or Firm* — Ostrager Chong Flaherty & Broitman P.C.

(57) ABSTRACT

A system for displaying pitch- and power-based guidance commands and flight path information for a variety of display modes (climb, cruise, descent, landing) to pilots in response to situations wherein the measured air data should not be relied upon. This information is presented in an intuitive and expedient manner exactly when and where it is needed on the primary flight display. The displayed information dynamically changes in response to airplane parameters.

20 Claims, 5 Drawing Sheets

PRIMARY FLIGHT DISPLAY PITCH- AND POWER-BASED UNRELIABLE AIRSPEED SYMBOLOGY

BACKGROUND

The embodiments disclosed hereinafter generally relate to systems and methods for determining pitch and power settings during flight when the air data system is detected to be unreliable or failed.

Modern commercial aircraft have increasing demands for availability and integrity of air data. Air data describes the air mass state of an aircraft around the aircraft during flight. This air data is used by pilots and on-board systems to make operational decisions and control actions regarding an aircraft. This air data may include, for example, pitot or total pressure, static pressure, angle of attack, angle of sideslip, and other suitable air data. Conventional sensors used to measure this type of data may be adversely affected by environmental conditions or other conditions or events. For example, ice or other foreign materials may prevent an accurate measurement of pressure by a pitot tube used to measure total pressure.

A pitot tube is a pressure measurement instrument used to measure fluid velocity. The measured pressure is the stagnation pressure of the air, which is also referred to as total pressure. Static pressure is the ambient air pressure at the present vehicle altitude, and total pressure is the sum of the static pressure and the impact pressure due to vehicle forward velocity. This measurement, together with static pressure measurements measured using static port sensors on the side of the fuselage, may be used to identify the impact pressure. The impact pressure may then be used to calculate an airspeed of the aircraft.

Signal processing circuits, based on pressure signals supplied from the pressure sensors, determine and supply signals representative of various flight-related parameters. In some applications, sensors and associated processing circuitry have been packaged together into what may be referred to as an air data module.

Air data systems provide airplanes with airspeed, altitude and vertical speed information. When conditions of unreliable or failed air data exist, the flight crew is presented with erroneous and conflicting information that can lead a crew to put the airplane into a potentially unsafe operating condition.

Unreliable or failed air data (altitude and/or airspeed) system events on commercial airplanes can result in an accident due to the flight crew's inability to recognize the failure, and/or inability to maintain a safe flight condition following the failure. These unreliable air data events can be a result of flight through volcanic ash, icing, birds or bugs, maintenance activity in which the airplane was not properly returned to flight worthy status (e.g., tape was not removed from static ports), or other faults. When these events occur at night, without external visual references, this exacerbates the difficulty in maintaining spatial orientation because flight-critical instruments are unavailable or erroneous.

When a pilot recognizes that the air data is unreliable, their training (reaching back to their general aviation training) requires the pilot to fly pitch and power. That is, transition from pulling (or pushing) on the control column to obtain a specific vertical speed (erroneous in these failures), to examining the pitch (how high the airplane is pointed above or below the horizon) and the power setting. Pilots have a conceptual idea of what combination of pitch/power is appropriate, and what is inappropriate. For example, if the airplane is pointed below the horizon toward the ground, and its thrust level is high, then regardless of what the onboard instruments show, the airplane must be accelerating. Recognizing that the instruments are erroneous and establishing a safe, known pitch and power configuration is crucial to keeping the airplane from entering a steep dive, or an excessive pitch up condition, which can lead to a stall.

U.S. Patent Application Publ. No 2010/0100260 A1 discloses a monitor for comparing primary air data with alternative (i.e., synthetic) air data for the purpose of determining whether the primary air data can be relied upon for performing operations with respect to the aircraft. The disclosure of US 2010/0100260 A1 is incorporated by reference herein in its entirety. For the purpose of the filing of patent applications claiming priority to the instant application, in countries which do not accept incorporations by reference, this disclosure includes a drawing (see FIG. 8) and associated written description taken directly from US 2010/0100260 A1.

There is a need for systems and methods for displaying pitch- and power-based guidance commands and flight path information in an intuitive manner after the occurrence of an unreliable or failed air data (altitude and/or airspeed) system event.

SUMMARY

In accordance with the embodiments disclosed hereinafter, a system displays pitch- and power-based guidance commands and flight path information for a variety of flight phases (climb, cruise, descent, landing) to pilots in response to situations wherein the measured air data should not be relied upon. This information is presented in an intuitive and expedient manner exactly when and where it is needed on the primary flight display. The displayed information dynamically changes in response to airplane parameters.

More specifically, Global Positioning Satellite (GPS) altitude or barometric altitude (if valid), airplane weight, flap setting, air/ground status, and throttle lever angle are used to determine the appropriate target pitch and thrust differential needed for either maximum climb thrust, thrust for level flight, thrust for a three-degree glideslope descent, or thrust for idle descent. The methodology focuses on controlling (and also annunciating) for pitch, power, speed, and vertical speed.

The embodiments disclosed herein use tables from pre-existing airplane performance data to determine the pitch and power settings for a variety of flight conditions when the air data system is detected to be unreliable or failed, in disagreement across the cockpit, or the pilot has selected alternate air data selections. The system presents this information in an easy-to-use manner on the primary flight display.

The displayed symbology is not static and updates as the airplane weight, altitude, flap setting and thrust change. As a result, critical information is communicated in a format that is intuitive and in a form that the pilot needs, and is expediently usable by the pilot to maintain safe, stable flight conditions as a result of air data failures throughout the duration of the flight. This symbology is independent of the angle of attack (AOA) or the air data system.

The presentation of special symbology indicating a desired pitch attitude and a thrust differential on the primary flight display can be manually activated by the pilot or can be automatically activated by a monitoring function executed by a computer, e.g., a flight control computer. The pilot could turn on the unreliable airspeed symbology by operation of a switch or as part of a checklist.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Modern airplanes typically comprise an air data system and an inertial reference system. The air data system provides airspeed, angle of attack, temperature and barometric altitude data, while the inertial reference system gives attitude, flight path vector, ground speed and positional data. All of this data is sent to an input signal management platform of a flight control system. The flight control system comprises a primary flight control computer/function and an auto-pilot computer/function. The primary flight control computer and auto-pilot computer can have independent input signal management platforms. Modern airplanes further comprise a display computer that controls a cockpit display to display data of use to the pilot.

Air data information for some current generation airplanes are provided by, for example, two ARINC 706 air data computers (ADCs). These computers are connected to conventional pitot tubes and static ports by pneumatic tubing that runs throughout the aircraft. Certain standby air data instruments and other systems, including primary flight control modules located in aircraft tail areas, are also connected to the pitot/static port tubing.

The conventional air data system is not shown in the drawings because it is familiar to persons of ordinary skill in the art of flight control. The skilled person would know, for example, how an air data computer takes static air pressure and ram air pressure data from the static ports and pitot tubes, and uses such data to determine aircraft altitude, airspeed and rate of climb or descent.

As previously explained, air data is used by pilots and on-board systems to make operational decisions and control actions regarding an aircraft. This air data may include, for example, pitot or total pressure, static pressure, angle of attack, angle of sideslip, and other suitable air data. Conventional sensors used to measure this type of data may be adversely affected by environmental conditions or other conditions or events. When conditions of unreliable or failed air data exist, the flight crew is presented with erroneous and conflicting information that can lead a crew to put the airplane into an unsafe and potentially catastrophic operating condition.

Figure 1:
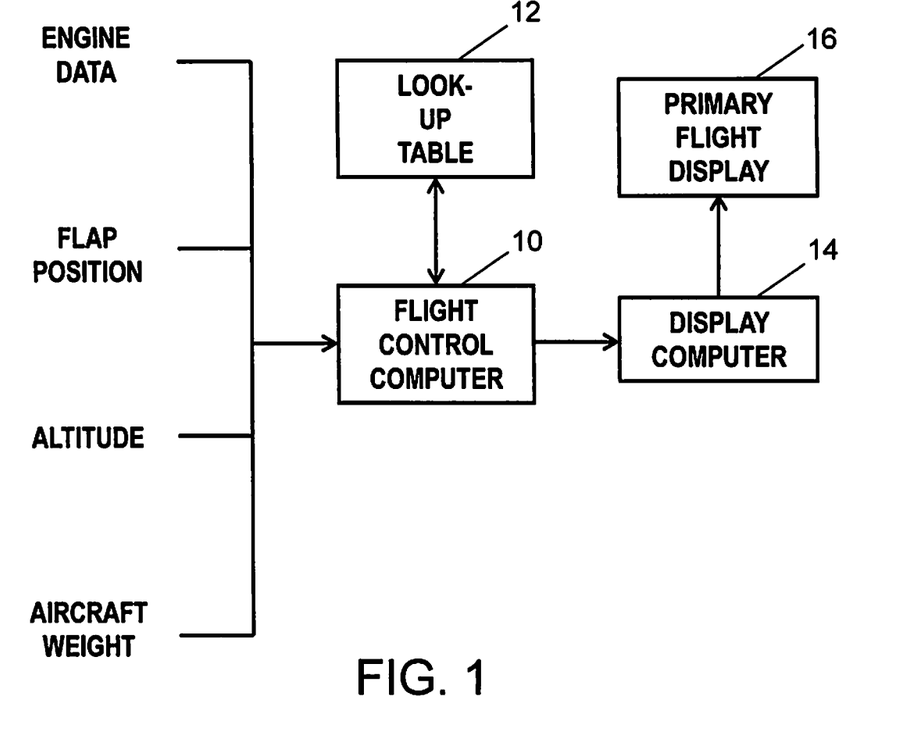
FIG. 1 is a block diagram showing some components of a system for displaying pitch- and power-based guidance commands and flight path information in accordance with one embodiment of the invention.

FIG. 1 shows components of a system for displaying pitch- and power-based guidance commands and flight path information in response to unreliable or failed air data (altitude and/or airspeed) system events. The system can be manually activated by the pilot or can be automatically activated by a monitoring function executed by a computer.

The system shown in FIG. 1 comprises a computer 10, e.g., a flight control computer, which receives engine data as well as data representing flap position, altitude and aircraft weight. The onboard subsystems for providing such data to a computer are well known to persons skilled in the art. The engine data may comprise the throttle lever angle, turbofan power ratio (TPR) or fan speed (N1); the flap position may be the actual or a selected flap position; the altitude may comprise GPS altitude, radio altitude, pressure altitude or voted static pressure state; and the aircraft weight is provided by the flight management computer (not shown in FIG. 1, but see FIG. 8).

To facilitate the display of special symbology in response to an unreliable or failed air data system event, computer 10 retrieves pitch- and power-based guidance command data from a look-up table (LUT) 12. The LUT 12 stores airplane performance data tables corresponding to known aircraft states for a variety of flight conditions. Such charts include desired pitch attitude and power setting for various flight phases, including climb, cruise, descent and final approach, and various parameters, including altitude, aircraft weight, flap position and engine data. The computer 10 retrieves data from LUT 12 by transmitting addresses to the LUT which are a function of the received data (i.e., engine data, flap position, altitude and aircraft weight). The LUT 12 will return data representing the desired pitch attitude and power setting for the particular operational conditions and flight phase of the aircraft.

In accordance with one embodiment, Global Positioning System (GPS) altitude or barometric altitude (if valid), airplane weight, flap setting, air/ground status, and throttle lever angle are used to determine the appropriate target pitch and thrust differential needed for either maximum climb thrust, thrust for level flight, thrust for a three-degree glideslope descent, or thrust for idle descent. The methodology focuses on controlling (and also annunciating) for pitch, power, mode, speed, and vertical speed.

Based on the information read from LUT 12 in response to a situation in which measured air data is unavailable or unreliable (either automatically detected or pilot detected), the computer 10 sends data representing pitch- and power-based guidance commands and flight path information for a particular flight phase to a display computer 14. In response to the data received from computer 10, display computer 14 controls a cockpit display, e.g., a primary flight display 16, to display symbology representing those same pitch- and power-based guidance commands and flight path information. This information is presented in an intuitive and expedient manner exactly when and where it is needed on the primary flight display. The displayed information dynamically changes in response to airplane parameters. Display computers are well-known in the art and the basic operation of display computer 14 will not be described in detail herein. The display computer 14 is programmed to cause special symbology to be displayed on the primary flight display 16 in response to commands from computer 10 that are transmitted when the measured air data is unavailable or unreliable or the pilot has made a specific switch selection representing an unreliable air data event. Alternatively, the relevant functions of the flight control computer and display computer disclosed herein could be performed by a single computer having a single processor or multiple processors.

In accordance with one embodiment, the computer 10 processes incoming data including aircraft weight, GPS altitude, flap setting and throttle lever angle, and then determines the mode for the primary flight display, a target pitch and a target engine power (e.g., TPR, N1, etc.) by reference to the LUT 12. The mode is determined based at least in part on the throttle lever angle. The throttle lever angle is a function of the angular position of the throttle levers, which are manually positioned by the pilot or the automatic throttle system. Each throttle lever is movable between a full thrust position and an idle position, with a range of motion therebetween. When the throttle levers are in or near their full thrust positions, the mode of the display is Maximum Climb; when the throttle levers are in or near their idle positions, the mode of the display is Idle Descent; and when the throttle levers are in intermediate positions in a range of motion between their full thrust and idle positions, the mode of the display is either Level Flight or −3 Degree Glideslope (i.e., landing). The throttle lever angle is used instead of the actual thrust being produced by the engines because the engines are slow to respond to changes in commanded thrust produced when the throttle lever is moved. Transitions between modes have a time delay to true and persistence to avoid rapidly entering/exiting different modes as a result of thrust changes.

Because the throttle levers can be in intermediate positions during either the Level Flight or −3 Degree Glideslope mode, additional information is required in order to discriminate which of these two modes should be displayed Anytime that the flaps are in landing configuration with gear down and the throttle lever angle is not in takeoff limits, then the computer 10 determines that the display mode should be −3 Degree Glideslope. Conversely, if the landing gear is up, computer 10 determines that the mode displayed should be Level Flight.

The LUT 12 comprises a respective data table for each flight phase. The source of the data (the proper pitch and power settings) is typically the aircraft manufacturer which can generate performance data for a wide spectrum of flight conditions. This same performance data is used to generate simplified tables found in the "Flight with Unreliable Airspeed" section of the Quick Reference Handbook. The flight control system disclosed herein uses the same aircraft performance data as is used to generate the existing charts because the fundamental task the pilot must perform is the same as on current airplanes: fly a known/safe pitch and power setting.

Figure 5:
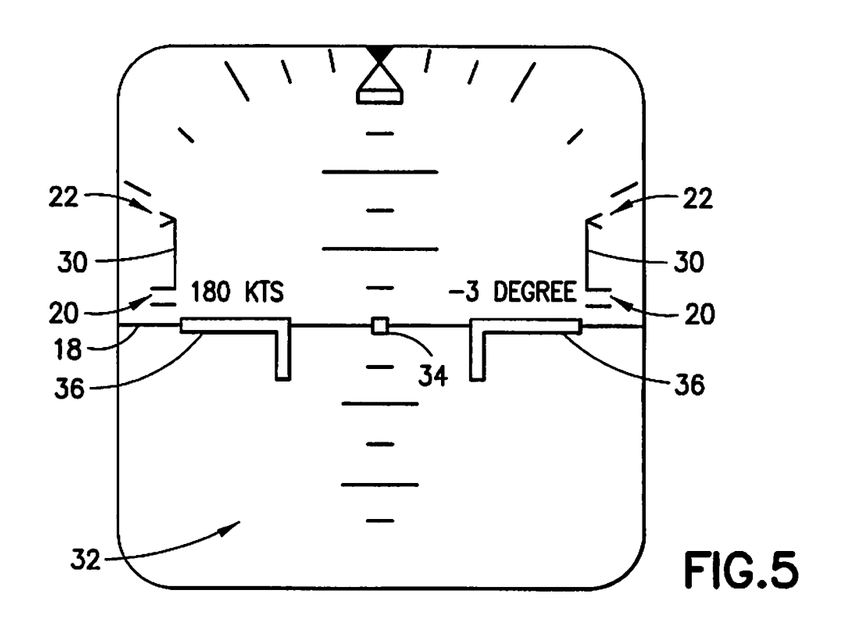
Figure 6:
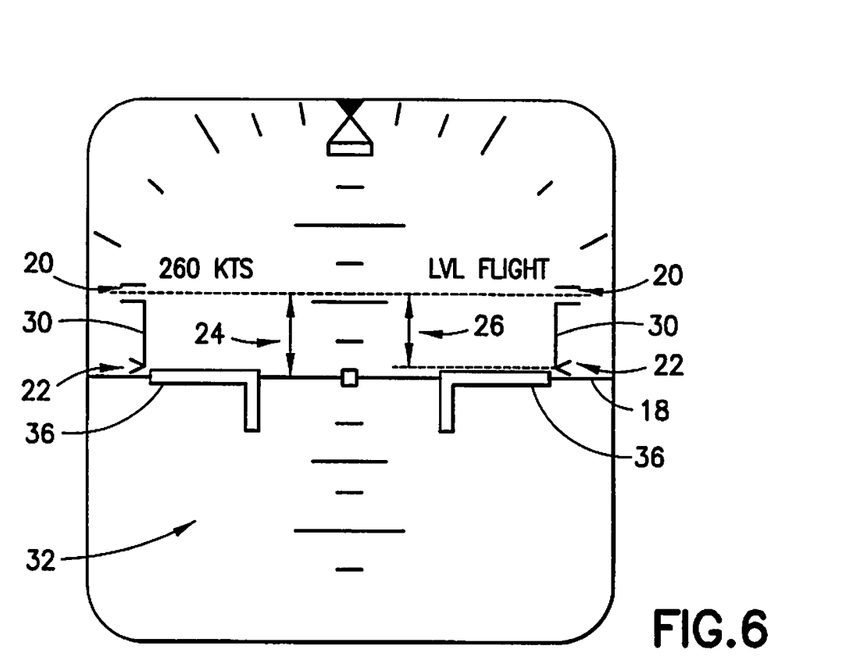
Figure 7:
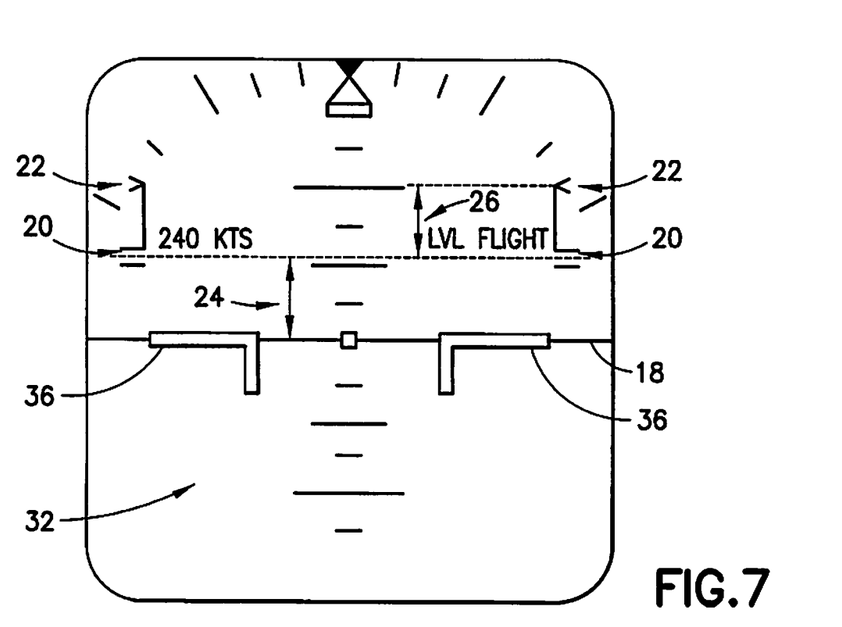

After computer 10 has determined the flight phase, it looks up the corresponding data table in the LUT 12. The data read out from LUT 12 may include any of the following: the pitch/power configuration for Level Flight, pitch for Idle Descent, pitch for Maximum Climb, or pitch/power for a −3 Degree Glideslope. Computer 10 sends data representing the mode and the desired pitch/power to the display computer 14, which in turn controls the primary flight display 16 to display symbology indicating that mode and desired pitch/power. More specifically, the primary flight display 16 displays tic marks (hereinafter "pitch tic marks") indicating a pitch target relative to a horizon indicator. These pitch tic marks 20 can be seen in FIGS. 2-7 (discussed in detail below). The primary flight display 16 may also display dynamic vertical lines indicating the amount of thrust that needs to be added or subtracted, i.e., the thrust differential. These dynamic lines 30 indicating the thrust differential extend above or below the pitch tic marks 20 and terminate at variable thrust tic marks 22, as can be seen in FIGS. 5-7 (discussed in detail below).

The various symbology displayed in accordance with the embodiments disclosed herein will now be described with reference to FIGS. 2-7, each of which is a screenshot of a pitch attitude indicator of a primary flight display. The attitude indicator of a conventional primary flight display provides information to the pilot about the aircraft's pitch and roll characteristics, and the orientation of the aircraft with respect to the horizon. Optionally, other information may appear on the attitude indicator, such as the margin to stall, a runway diagram, flight director(s), and ILS localizer and glide-path "needles". The displayed information can be dynamically updated as required. The conventional primary flight display further comprises airspeed and altitude indicators (not shown in FIGS. 2-7) which are usually displayed to the left and right, respectively, of the attitude indicator.

Figure 2:
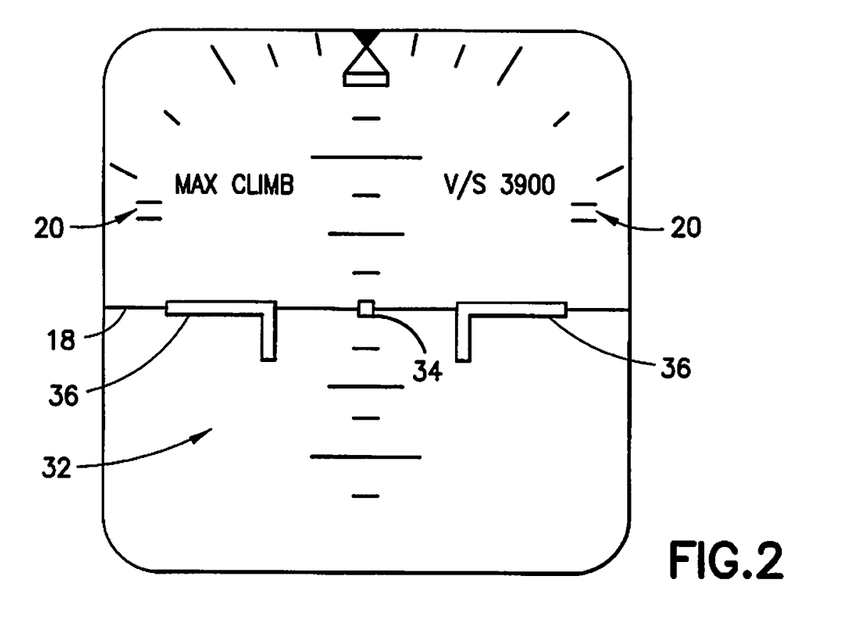
FIGS. 2-7 are diagrams showing a central portion of a primary flight display comprising an attitude indicator, each diagram showing the display of pitch and thrust information by the system shown in FIG. 1 under differing flight conditions.

FIG. 2 is an exemplary screenshot depicting a state of the attitude indicator when the primary air data system has failed or cannot be relied upon and the display is in Maximum Climb thrust mode. The display computer controls the primary flight display to display two pairs of pitch tic marks 20. In this example, the pitch tic marks 20 are disposed near the left and right boundaries of the attitude indicator at the same height above horizontal line 18 (hereinafter "horizon indicator"), which indicates the horizon. Each set of pitch tic marks 20 comprises a pair of short mutually parallel horizontal lines. The short horizontal lines 32 of different length which appear in the central portion of the attitude indicator at equal-spaced vertical intervals form a scale showing a respective set of pitch angles. The small square 34 at the center of the attitude indicator represents the nose of the aircraft, while the L-shaped symbols 36 on opposite sides of the central square 34 represent the wings of the aircraft. Symbols 34 and 36 are always displayed and are fixed, i.e., do not move on the attitude indicator, whereas the pitch angle scale lines 32 and horizon indicator 18 move in unison as the pitch angle of the aircraft changes.

The fact that the horizon indicator 18 is aligned with symbols 36 and 34 in FIG. 2 indicates that the current pitch angle of the aircraft is zero. The pitch tic marks 20 are placed at the pitch attitude which corresponds to the target pitch setting for Maximum Climb. Since the maximum climb rate is desired, the pitch angle of the aircraft must be increased (e.g., by upward deflection of the elevators) to the target pitch setting. Since the symbology disclosed herein responds dynamically to changes in pitch angle, as the pitch angle of the aircraft increases upward, the pitch tic marks 20 will move downward toward alignment with the wing symbols 36. The horizon indicator 18 and the scale lines 32 also move in tandem with the pitch tic marks 20.

In addition to graphical symbols, associated alphanumeric labels can be displayed on the attitude indicator of the primary flight display. The information imparted by such labels can include the flight phase or display mode and an estimate of what the speed or vertical speed will be when the pitch angle reaches the target pitch angle and thrust reaches the target thrust level. These labels respond to throttle lever changes for mode awareness. Each label may be displayed in proximity to and moves in tandem with a respective set of pitch tic marks. For example, as shown in FIG. 2, the label "MAX CLIMB", indicating the flight phase or thrust mode, is displayed above, to the right of and in proximity to the pitch tic marks 20 on the left-hand side of the attitude indicator, while the label "VIS 3900" is displayed above, to the left of and in proximity to the pitch tic marks 20 on the right-hand side. This indicates to the pilot that the aircraft is in the Maximum Climb mode and that the estimated vertical speed of the aircraft will be 3900 ft/min when the pitch angle reaches the target pitch angle. The target pitch setting does not change relative to the horizon indicator so long as the throttle lever angle remains within the limits specified for that mode (in this case, Maximum Climb).

Figure 3:
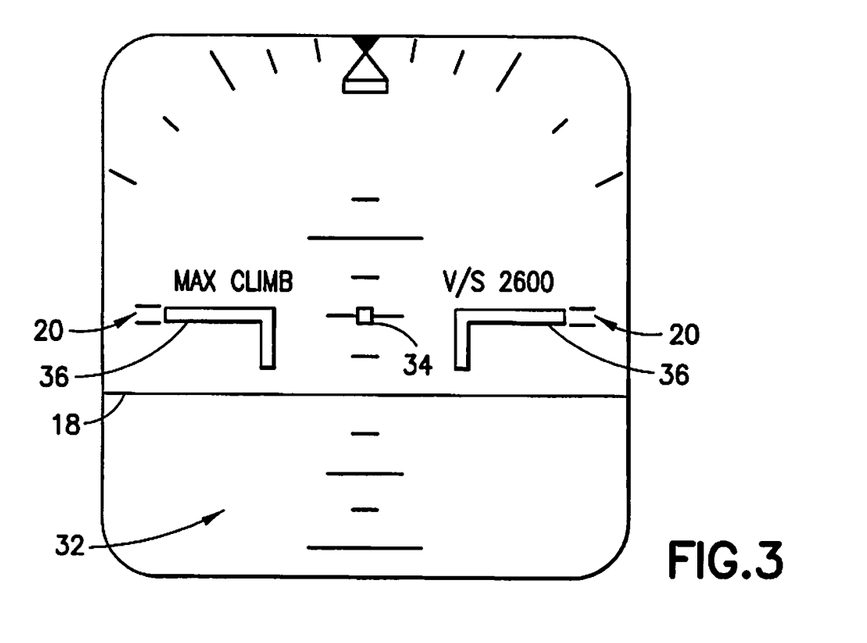

FIG. 3 is an exemplary screenshot depicting a state of the attitude indicator when the primary air data system has failed or cannot be relied upon and the aircraft is in Maximum Climb mode. The display computer controls the primary flight display to display two pairs of pitch tic marks 20. FIG. 3 depicts the appearance of the attitude indicator in an instance wherein the pitch attitude of the aircraft equals the target pitch setting for Maximum Climb. In this example, the pitch tic marks 20 and wing symbols 36 are shown in alignment (i.e., at the same height on the display), which indicates to the pilot that the aircraft is at the target pitch angle. The horizon indicator 18 is displayed at an elevation below the wing symbols, which indicates to the pilot that the aircraft is pointed above the horizon.

FIGS. 2 and 3 depict instances in which the labels are placed slightly higher than the pitch tic marks 20 when the pitch angle is less than (see FIG. 2) or equal to (see FIG. 3) the target pitch angle. Conversely, in instances wherein the pitch angle is greater than the target pitch angle, the labels are placed slightly lower than the pitch tic marks. One such example is depicted in FIG. 4.

Figure 4:
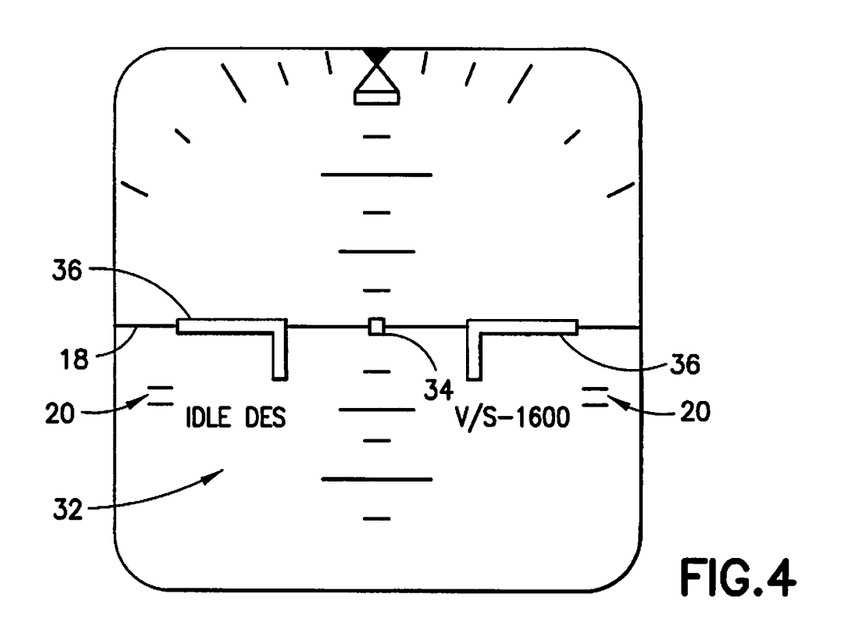

FIG. 4 is an exemplary screenshot depicting a state of the attitude indicator when the primary air data system has failed or cannot be relied upon and the aircraft is in Idle Descent mode. Again the display computer controls the primary flight display to display two pairs of pitch tic marks 20. In this example, the pitch tic marks 20 are disposed near the left and right boundaries of the attitude indicator at the same height below the horizon indicator 18. The fact that the horizon indicator 18 is aligned with symbols 36 in FIG. 4 again indicates to the pilot that the current pitch angle of the aircraft is zero. In this example, the pitch tic marks 20 are placed at the pitch attitude which corresponds to the target pitch setting for the Idle Descent mode. In this example, the pitch angle of the aircraft must be decreased (e.g., by downward deflection of the elevators) to the target pitch setting. This symbology responds dynamically to changes in pitch angle, i.e., as the pitch angle of the aircraft decreases downward, the pitch tic marks 20 will move upward toward alignment with the wing symbols 36. The horizon indicator 18 and the scale lines 32 will also move in tandem with the pitch tic marks 20.

As shown in FIG. 4, the label "IDLE DES", indicating the display mode, is displayed below, to the right of and in proximity to the pitch tic marks 20 on the left-hand side of the attitude indicator, while the label "V/S −1600" is displayed below, to the left of and in proximity to the pitch tic marks 20 on the right-hand side. This indicates to the pilot that the aircraft is in the Idle Descent mode and that the estimated vertical speed of the aircraft will be −1600 ft/min at the target pitch angle. The target pitch setting does not change relative to the horizon indicator for the Idle Descent mode so long as the throttle lever angle remains within the limits for "Idle descent mode."

In accordance with one embodiment, the pitch tic marks are displayed as a function of the following inputs: GPS altitude, throttle lever angle, aircraft weight and flap setting. In accordance with another embodiment, the primary flight display will additionally show variable thrust tic marks 22 which are connected to the pitch tic marks 20 by respective dynamic vertical lines 30, as shown in FIGS. 5-7. These variable thrust tic marks are displayed as a function of the following inputs: GPS altitude, throttle lever angle, aircraft weight, flap setting and current thrust. The position of the variable thrust tic marks 22 and the length of the dynamic vertical lines 30 change as the current thrust changes. The variable thrust tic marks are displayed only when the aircraft is in either the Level Flight thrust mode or the −3 Degree Glideslope mode. The distance between the variable thrust tic mark 22 on one side and a midpoint between the pair of pitch tic marks 20 on the same side indicates the difference between the current thrust and the target thrust (hereinafter "thrust differential"). More specifically, when a variable thrust tic mark 22 is positioned above the associated pitch tic marks 20, the graphical depiction of the thrust differential indicates the amount of thrust that needs to be subtracted from the current thrust to reach the target thrust; conversely, when a variable thrust tic mark 22 is positioned below the associated pitch tic marks 20, the graphical depiction of the thrust differential indicates the amount of thrust that needs to be added to the current thrust to reach the target thrust. The graphical depiction of the thrust differential is scaled to avoid interference with roll and slip/skid indicators (i.e., the triangle and rectangle at the top of the display). Tic mark position and thrust differential are filtered to reduce the risk of over-controlling to a moving target by the flight crew. More specifically, as a result of the inaccuracies in estimating TPR using GPS altitude versus pressure altitude, the TPR differential thrust sliders are desensitized so as to show zero error within a band of ~±5 TPR so as to avoid overcontrolling oscillations in an attempt to zero out a target which may not be accurate to 1 TPR anyway.

FIG. 5 is an exemplary screenshot depicting a state of the attitude indicator when the primary air data system has failed or cannot be relied upon and the aircraft is in −3 Degree Glideslope mode. Again the display computer controls the primary flight display to display two pairs of pitch tic marks 20 on the left- and right-hand sides. In this example, the pitch tic marks 20 are disposed near the left and right boundaries of the attitude indicator at the same height above the horizon indicator 18. The fact that the horizon indicator 18 is aligned with symbols 34 and 36 in FIG. 5 again indicates to the pilot that the current pitch angle of the aircraft is zero. In this example, the pitch tic marks 20 are placed at the pitch attitude which corresponds to the target pitch setting for a −3 degree descent. In this example, the guidance being provided to the pilot indicates that the pitch angle of the aircraft should be increased to the target pitch setting.

As shown in FIG. 5, the label "−3 DEGREE", indicating the display mode, is displayed above, to the left of and in proximity to the pitch tic marks 20 on the right-hand side of the attitude indicator, while the label "180 KTS" is displayed above, to the right of and in proximity to the pitch tic marks 20 on the left-hand side. This indicates to the pilot that the aircraft is in the −3 Degree Glideslope mode and that the estimated speed of the aircraft will be 180 knots when the aircraft reaches the target pitch angle and target thrust.

Furthermore, FIG. 5 displays a pair of variable thrust tic marks 22 which are respectively connected to corresponding pitch tic marks 20 by respective vertical lines 30. Because the variable thrust tic marks 22 are positioned above the respective pitch tic marks 20, the distance from the vertex of a thrust tic mark 22 to a midpoint between the associated pitch tic marks 20 on the same side indicates to the pilot the amount of thrust that needs to be subtracted from the current thrust to reach the target thrust. As the pilot reduces the thrust (for the sake of illustration, assume that the pitch is not changing), the variable thrust tic marks 22 will move downward (approaching the corresponding pitch tic marks) and the dynamic vertical lines 30 will decrease in length, until when the current thrust equals the target thrust, the variable thrust tic marks 22 will be displayed between the associated pitch tic marks 20 on respective sides of the attitude indicator. This will indicate to the pilot that the thrust setting is correct.

FIG. 6 shows the use of similar symbology to depict a state of the attitude indicator when the primary air data system has failed or cannot be relied upon and the aircraft is in the Level Flight mode. Again the display computer controls the primary flight display to display two pairs of pitch tic marks 20 on the left- and right-hand sides. In this example, the pitch tic marks 20 are disposed near the left and right boundaries of the attitude indicator at the same height above the horizon indicator 18. The fact that the horizon indicator 18 is aligned with symbols 34 and 36 in FIG. 5 again indicates to the pilot that the current pitch angle of the aircraft is zero. In this example, the pitch tic marks 20 are placed at the pitch attitude which corresponds to the target pitch setting for Level Flight. In this example, the guidance being provided to the pilot indicates that the pitch angle of the aircraft should be increased to the target pitch setting.

As shown in FIG. 6, the label "LVL FLIGHT", indicating the display mode, is displayed above, to the left of and in proximity to the pitch tic marks 20 on the right-hand side of the attitude indicator, while the label "260 KTS" is displayed above, to the right of and in proximity to the pitch tic marks 20 on the left-hand side. This indicates to the pilot that the aircraft is in the Level Flight thrust mode and that the estimated speed of the aircraft will be 260 knots when the aircraft reaches the target pitch angle and target thrust.

Furthermore, FIG. 6 displays a pair of variable thrust tic marks 22 which are respectively connected to corresponding pitch tic marks 20 by respective vertical lines 30. Because the variable thrust tic marks 22 are positioned below the respective pitch tic marks 20, the distance from the vertex of a thrust tic mark 22 to a midpoint between the associated pitch tic marks 20 on the same side (the midpoints are connected by a horizontal dashed line in FIG. 6) indicates to the pilot the amount of thrust that needs to be added to the current thrust to reach the target thrust. As the pilot increases the thrust (for the sake of illustration, assume that the pitch is not changing), the variable thrust tic marks 22 will move up (approaching the corresponding pitch tic marks) and the dynamic vertical lines 30 will decrease in length, until when the current thrust equals the target thrust, the variable thrust tic marks 22 will be displayed between the associated pitch tic marks 20 on respective sides of the attitude indicator. Again this will indicate to the pilot that the thrust setting is correct.

In FIG. 6, the vertical line 24 with oppositely directed arrowheads at the ends thereof indicates the magnitude of the pitch differential (variable), while the vertical line 26 with oppositely directed arrowheads at the ends thereof indicates the magnitude of the thrust differential (variable). It should be understood that vertical lines 24 and 26 and the horizontal dashed lines are not part of the actual display, but rather are graphical symbols for indicating the differentials depicted by symbols 20, 22 and 30.

FIG. 7 shows the use of similar symbology to depict a state of the attitude indicator when the primary air data system has failed or cannot be relied upon and the aircraft is in the Level Flight mode. FIG. 7 differs from FIG. 6 in that the target speed is indicated to be "240 KTS" instead of "260 KTS". FIG. 7 further differs in that, instead of the target thrust being greater than the current thrust as depicted in FIG. 6, the target thrust is less than the current thrust, indicating to the pilot that the thrust should be reduced. In summary, FIG. 6 indicates a situation wherein the pitch and thrust should be increased, while FIG. 7 indicates a situation wherein the pitch should be increased and the thrust should be reduced.

Being that the pilot needs to know whether to add or subtract thrust and by how much when the mode is Level Flight or −3 Degree Glideslope, the computer 10 (see FIG. 1) needs the following information: (1) current thrust (this is most likely an N1 or a TPR, an engine RPM or pressure parameter, respectively); (2) target thrust (the N1 or TPR value from the tables for "thrust for level flight"); and (3) the difference between these two. This is the thrust differential used to display the dynamic (i.e., moving) lines that extend above or below the pitch tic marks. For example, assume an aircraft is flying with the throttle lever near the middle position, when an air data failure occurs. The system then displays symbols for the level flight mode. The computer determines that a 6-degree pitch target is needed. In response to a suitable command, the display computer 14 causes the primary flight display 16 to display two pairs of pitch tic marks to indicate the desired pitch attitude. Then the computer 10 looks up that an N1 engine value of 55 is needed. The computer 10 receives information indicating that the current N1 value on the engines is 76. So, the thrust differential is +21 N1. That number is used to draw the symbols 22 above the pitch tic marks seen in FIG. 7. As the pilot brings back the engine thrust, that differential gets smaller and smaller, until the N1 engine value equals 55, i.e., the moving lines 30 get shorter and shorter until they disappear.

The variable thrust tic marks 22 and dynamic vertical lines 30 are refreshed very fast (at the same rate as the primary flight display), so it is a moving target that the crew can position the throttle levers to. For example, in a known primary flight display, the displayed symbology is updated continually at roughly 20 times per second.

In contrast, the pitch tic marks and airspeed/altitude/vertical speed text estimations need not be updated so frequently. The weight and altitude used to generate the static pitch tic marks over the short term are static, because as the pilot flies a pitch attitude, the pitch target should not change dynamically. This would reduce the ability of the pilot to track the pitch target tightly and consistently. However, as the aircraft burns fuel and descends, the pitch attitude targets that the pilot should be flying will change, and that is one of the benefits of the system disclosed herein: it will use that updated weight and altitude to calculate a new pitch target. It may be desirable to update the pitch target once or twice per minute, so it would be intermittent, just so the pitch target does not move around too fast, but is still set up to be dynamic over the long term (remainder of the flight to landing).

In accordance with one embodiment, the computer 10 (see FIG. 1) is programmed to monitor the air data. This is accomplished by comparing a sensed dynamic pressure value (actual q) with a synthetic dynamic pressure value (synthetic q). The synthetic (i.e., internal) dynamic pressure is based on an estimated coefficient of lift, which in turn is a function of the angle of attack and other factors. That synthetic dynamic pressure is then compared to the dynamic pressure sensed on the pitot probes in the airstream. In response to the sensed dynamic pressure deviating from the synthetic dynamic pressure by more than a threshold value, the monitor is tripped, the unreliable air data is flagged and new symbology indicating the desired pitch attitude and a thrust differential are presented on the primary flight display.

In accordance with one embodiment, the reliability of the air data can be tested by comparing a synthetic dynamic pressure $q_{LIFT}$ with the dynamic pressure sensed by pitot probes in the airstream (actual dynamic pressure). The synthetic dynamic pressure is computed based on an estimated coefficient of lift $C_L$ as follows:

$$q_{LIFT} = L/(C_L \times S)$$

where the lift force $L = W \times n_Z$; W is the gross weight of the aircraft; $n_Z$ is the load factor; S is the wing area; and $C_L = C_{L0} + \Delta C_L + C_{L\alpha} \times \alpha_{VANES}$, where $C_{L0}$ is the lift coefficient at angle of attack equal to zero, $\Delta C_L$ is the change in the lift coefficient caused by high-lift and movable surfaces, $C_{L\alpha}$ is the slope of the lift coefficient as a function of $\alpha_{VANES}$, and $\alpha_{VANES}$ is the angle of attack as measured by angle of attack sensors.

It is well known that dynamic pressure equals $\frac{1}{2}\rho v^2$, where $\rho$ is the density of the air through which the aircraft is flying and v is the velocity of the aircraft. Because a synthetic dynamic pressure is available, the flight control computer can solve for v and give the flight crew a back-up airspeed to fly once the state indicating disagreement between actual and synthetic dynamic pressure has been tripped.

Once again, this is actually accomplished by comparing both the synthetic and sensed dynamic pressure q. With bad altitude (bad static pressure), this goes into the $C_L$ calculation above and will make the synthetic q erroneous, hence tripping the same monitor, thereby detecting "bad air data." Optionally, if either the measured airspeed or the measured altitude is unreliable, all of the primary air data is flagged as being erroneous.

Figure 8:
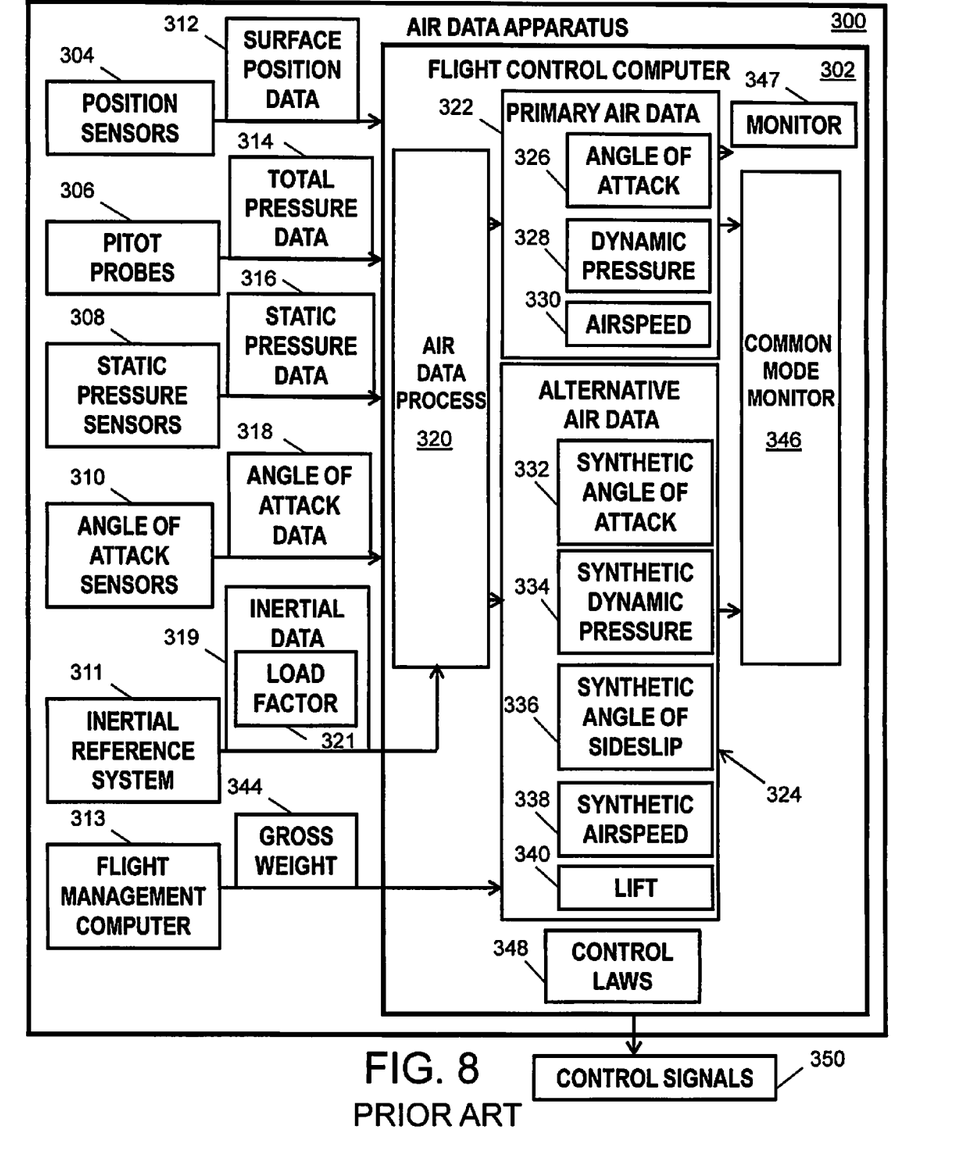
FIG. 8 is a block diagram of a known system for computing a synthetic dynamic pressure.

FIG. 8 is a drawing copied from US 2010/0100260 A1 and depicts components of a known air data system 300 which may be used to identify air data for use in generating control signals to control the operation of an aircraft. This known air data system 300 includes a flight control computer 302, which is in communication with position sensors 304, pitot probes 306, static pressure sensors 308, angle of attack sensors 310, an inertial reference system 311, and a flight management computer 313. Position sensors 304, pitot probes 306, static pressure sensors 308, and/or angle of attack sensors 310 may be redundant probes and sensors. In other words, the different probes and sensors may provide the same information. This redundancy in information is used to enhance the availability and the integrity of the data the sensors measure.

Position sensors 304 generate surface position data 312 representing the positions of control surfaces and high-lift surfaces on an aircraft. These control surfaces include, for example, elevators, horizontal stabilizers, ailerons, rudders, trim tabs, spoilers, flaps, slats, and other movable surfaces. Position sensors 304 may be associated with actuators used to move and position these control surfaces. Any type of position sensor may be used depending on the particular implementation.

Pitot probes 306 are sensors that measure total pressure as the moving air is brought to rest within the pitot probe. As a result of these measurements, total pressure data 314 is generated. Pitot probes 306 may be located on the fuselage of an aircraft.

Static pressure sensors 308 generate static pressure data 316. These sensors also may be located on the fuselage of an aircraft. Static pressure sensors 308 may take the form of a static ports. A static port may be a flush-mounted hole in the fuselage of an aircraft.

Angle of attack sensors 310 generate angle of attack data 318. Angle of attack sensors 310 also may be located on the fuselage of an aircraft. Angle of attack sensors 310 may be implemented using angle of attack vane sensors. An angle of attack vane sensor is an air data sensor in which the vane is attached to a shaft that may rotate freely. This type of sensor measures the airplane's angle of attack.

The inertial reference system 311 generates inertial data 319. Inertial data 319 includes data such as the load factor 321.

The data from angle of attack sensors 310, pitot probes 306 and static sensors 308 are used by an air data process 320 to compute primary air data 322 and alternative air data 324. Further, inertial data 319 from inertial reference system 311 may also be used to compute the alternative air data 324. The primary air data 322 includes angle of attack 326, dynamic pressure 328 and airspeed 330. The alternative air data 324 includes synthetic angle of attack 332, synthetic dynamic pressure 334, synthetic angle of sideslip 336 and synthetic airspeed 338. Alternative air data 324 may be used to validate primary air data 322. Additionally, alternative air data 324 may be used in the instance where primary air data 322 cannot be used or is not supplied.

In these examples, angle of attack 326 may be angle of attack data 318 or derived from angle of attack data 318. Dynamic pressure 328 and airspeed 330 may be calculated from total pressure data 314 and static pressure data 316.

Synthetic angle of attack 332 may be calculated using surface position data 312, lift 340, and dynamic pressure 328. Lift 340 is calculated by air data process 320. Lift 340 is calculated using gross weight 344 and load factor 321. In this example, gross weight 344 is the weight estimate for the aircraft. Synthetic dynamic pressure 334 is calculated from lift 340, surface position data 312, and angle of attack data 318. Lift 340 equals gross weight 344 of the aircraft times the load factor. This force is a function of three variables. These variables include the positions of high-lift and control surfaces, the dynamic pressure, and the angle of attack of the wing. If lift 340 and surface position data 312 are known, a synthetic dynamic pressure 334 may be calculated if the angle of attack is also known, and a synthetic angle of attack 332 may be calculated if the dynamic pressure is also known. The synthetic dynamic pressure 334 may be used to generate or identify synthetic airspeed 338 of an aircraft. Synthetic dynamic pressure 334 also may be used to validate both total pressure data 314 and static pressure data 316.

Still referring to FIG. 8, a common mode monitor 346 compares primary air data 322 with alternative air data 324. This comparison may be made to determine whether primary air data 322 can be relied upon for performing control operations with respect to the aircraft. For example, common mode monitor 346 may compare synthetic angle of attack 332 with angle of attack 326. This comparison may be made to determine whether angle of attack 326 can be used in operating the aircraft. In a similar fashion, dynamic pressure 328 may be compared with synthetic dynamic pressure 334 to monitor and identify faults that may affect pitot probes 306 or static pressure sensors 308.

In this manner, common mode monitor 346 may provide primary air data 322, such as total pressure data 314, static pressure data 316, and angle of attack data 318, to the flight control computer 302 for use by control laws 348 to generate control signals 350. Control signals 350 may control various components such as control surfaces and engines. Monitor 347 may be another monitor used by the flight control computer 302 for comparing data within a group of sensors, such as, for example, within position sensors 304, within pitot probes 306, within static pressure sensors 308, and within angle of attack sensors 310. Monitor 347 may be any monitor such as, for example, an in-line monitor.

If common mode monitor 346 and/or monitor 347 in air data process 320 determine that certain sensors are not providing air data as needed, control laws 348 or other airplane functions may use the alternative air data 324. This secondary source of data may be, for example, synthetic angle of attack 332 and/or synthetic dynamic pressure 334 for flight control computer 302 to use. Control laws 348 or other airplane functions may use primary air data 322 or alternative air data 324 to generate control signals 350 to control the operation of the aircraft.

The symbology disclosed herein gives the flight crew the pitch and power references needed to return to or maintain a safe flight configuration. The new symbology can indicate the pitch/power configuration for level flight, pitch for idle descent, pitch for maximum climb rate, or pitch/power for a −3 degree glide path. The new symbology gives the flight crew enough accurate data to allow them to reach an airport and land safely.

This design immediately and intuitively presents the pitch/power solutions to the pilot on the primary flight display exactly when it is needed the most: during a high workload air data or angle of attack failure in which the pilot must immediately fly pitch and power to maintain safe flight. This design does not require the pilot to look up these values in a reference manual (subsequently reducing reference errors and reaction time). The display is a way of depicting the fundamental task that a pilot does during periods of air data failures on the instrument that the pilot must reference during establishing the proper pitch and power settings, i.e., the primary flight display. Additionally, in subsequent phases of flight, the modified pitch and power settings (for descent and landing) are shown to the pilot on their primary instruments, freeing up crew workload which previously may have been spent referencing the unreliable airspeed tables manually.

The system and method disclosed herein is not limited to use on airplanes, but rather can also be used in airplane flight simulators.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system which has at least one computer or processor, and may have two or more computers or processors.

The invention claimed is:

1. A method for displaying information to an aircraft pilot during actual or simulated flight, comprising:
   displaying an aircraft symbol representing a portion of an aircraft;
   displaying a horizon indicator having a position relative to said aircraft symbol which is a function of a current pitch attitude;
   determining a display mode as a function of at least a current angle of a throttle lever;
   determining a target pitch attitude as a function of at least said determined display mode, a current altitude and a current aircraft weight; and
   displaying first symbology representing said target pitch attitude, said displayed first symbology having a position relative to said aircraft symbol which is a function of a difference between said current pitch attitude and said target pitch attitude.

2. The method as recited in claim 1, wherein said first symbology is displayed when primary air data is unavailable or unreliable.

3. The method as recited in claim 1, wherein the display mode is determined as a function of at least a current angle of a throttle lever and a current flap setting.

4. The method as recited in claim 3, further comprising causing said first symbology to move relative to said aircraft symbol as the current pitch attitude changes relative to said target pitch attitude, said first symbology being aligned with said aircraft symbol when the current pitch attitude equals said target pitch attitude.

5. The method as recited in claim 1, further comprising:
   determining a target thrust as a function of at least said determined display mode, said current altitude and said current aircraft weight; and
   displaying second symbology representing a current thrust, said displayed second symbology having a position relative to said first symbology which is a function of a difference between said current thrust and said target thrust.

6. The method as recited in claim 5, further comprising causing said second symbology to move relative to said first symbology as the current thrust changes relative to said target thrust and as the current pitch attitude is held constant, said second symbology being aligned with said first symbology when the current thrust equals said target thrust.

7. The method as recited in claim 6, further comprising displaying a vertical line that connects said first and second symbologies when said first and second symbologies are not aligned with each other, wherein a length of said line changes as a function of the difference between the current thrust and said target thrust.

8. A method for displaying information to an aircraft pilot during actual or simulated flight, comprising:
   displaying an aircraft symbol representing a portion of an aircraft;
   displaying a horizon indicator having a position relative to said aircraft symbol which is a function of a current pitch attitude;
   determining a display mode as a function of at least a current angle of a throttle lever;
   displaying first symbology representing a current thrust;
   determining a target pitch attitude as a function of at least said determined display mode, a current altitude and a current aircraft weight;
   determining a target thrust as a function of at least said determined display mode, said current altitude and said current aircraft weight; and
   displaying second symbology representing a target pitch attitude, said displayed second symbology having a position relative to said first symbology which is a function of a difference between the current thrust and said target thrust.

9. The method as recited in claim 8, further comprising causing said second symbology to move relative to said first symbology as the current thrust changes relative to said target thrust, said second symbology being aligned with said first symbology when the current thrust equals said target thrust.

10. The method as recited in claim 9, further comprising displaying a vertical line that connects said first and second symbologies when said first and second symbologies are not aligned with each other, wherein a length of said line changes as a function of the difference between the current thrust and said target thrust.

11. A system for displaying information to an aircraft pilot during actual or simulated flight, comprising a cockpit display and a computer system that controls said cockpit display, said computer system being programmed to perform the following operations:
   causing said cockpit display to display an aircraft symbol representing a portion of an aircraft;
   causing said cockpit display to display a horizon indicator having a position relative to said aircraft symbol which is a function of a current pitch attitude;
   determining a display mode as a function of at least a current angle of a throttle lever;

determining a target pitch attitude as a function of at least said determined display mode, a current altitude and a current aircraft weight; and causing said cockpit display to display first symbology representing said target pitch attitude, said displayed first symbology having a position relative to said aircraft symbol which is a function of a difference between said current pitch attitude and said target pitch attitude.

12. The system as recited in claim 11, wherein said first symbology is displayed when primary air data is unavailable or unreliable.

13. The system as recited in claim 11, wherein the display mode is determined as a function of at least a current angle of a throttle lever and a current flap setting.

14. The system as recited in claim 13, wherein said computer system is further programmed to cause said first symbology displayed by said cockpit display to move relative to said aircraft symbol as the current pitch attitude changes relative to said target pitch attitude, said first symbology being aligned with said aircraft symbol when the current pitch attitude equals said target pitch attitude.

15. The system as recited in claim 11, wherein said computer system is further programmed to perform the following operations:

determining a target thrust as a function of at least said determined display mode, said current altitude and said current aircraft weight; and causing said cockpit display to display second symbology representing a current thrust, said displayed second symbology having a position relative to said first symbology which is a function of a difference between said current thrust and said target thrust.

16. The system as recited in claim 15, wherein said computer system is further programmed to cause said second symbology to move relative to said first symbology on said cockpit display as the current thrust changes relative to said target thrust and as the current pitch attitude is held constant, said second symbology being aligned with said first symbology when the current thrust equals said target thrust.

17. The system as recited in claim 16, wherein said computer system is further programmed to cause said cockpit display to display a vertical line that connects said first and second symbologies when said first and second symbologies are not aligned with each other, wherein a length of said line changes as a function of the difference between the current thrust and said target thrust.

18. A system for displaying information to an aircraft pilot during actual or simulated flight, comprising a cockpit display and a computer system that controls said cockpit display, said computer system being programmed to perform the following operations:

causing said cockpit display to display an aircraft symbol representing a portion of an aircraft;

causing said cockpit display to display a horizon indicator having a position relative to said aircraft symbol which is a function of a current pitch attitude;

determining a display mode as a function of at least a current angle of a throttle lever;

causing said cockpit display to display first symbology representing a current thrust;

determining a target pitch attitude as a function of at least said determined display mode, a current altitude and a current aircraft weight;

determining a target thrust as a function of at least said determined display mode, said current altitude and said current aircraft weight; and causing said cockpit display to display second symbology representing a target pitch attitude, said displayed second symbology having a position relative to said first symbology which is a function of a difference between the current thrust and said target thrust.

19. The system as recited in claim 18, wherein said computer system is further programmed to cause said second symbology to move relative to said first symbology on said cockpit display as the current thrust changes relative to said target thrust, said second symbology being aligned with said first symbology when the current thrust equals said target thrust.

20. The system as recited in claim 19, wherein said computer system is further programmed to cause said cockpit display to display a vertical line that connects said first and second symbologies when said first and second symbologies are not aligned with each other, wherein a length of said line changes as a function of the difference between the current thrust and said target thrust.

\* \* \* \* \*